United States Patent

Holster et al.

[11] 4,040,290
[45] Aug. 9, 1977

[54] VIBRATION AMPLITUDE TRANSDUCER

[75] Inventors: Peter Leendert Holster; Adam Ooms, both of Eindhoven; Marinus Johannes Gerardus van den Hoogen, Venlo, all of Netherlands

[73] Assignee: U.S. Philips Corporation, New York, N.Y.

[21] Appl. No.: 622,096

[22] Filed: Oct. 14, 1975

[30] Foreign Application Priority Data

Oct. 30, 1974 Netherlands .................... 7414155

[51] Int. Cl.² .................. G01H 1/00; G01P 15/02
[52] U.S. Cl. ................................. 73/71; 73/515
[58] Field of Search .............. 73/67, 67.2, 67.3, 67.4, 73/70, 70.2, 71, 71.5 R, 515

[56] References Cited

U.S. PATENT DOCUMENTS

| 2,551,289 | 5/1951 | Quinlan ................................. 73/71.5 |
| 3,267,725 | 8/1966 | Connaught ............................. 73/71 |

FOREIGN PATENT DOCUMENTS

| 91,033 | 2/1968 | France ................................. 73/70 |

OTHER PUBLICATIONS

R. E. Sarkisyan, A Jet Device for Measuring the Maximum Amplitude of Vibration, Instrumentation and Control, Aug. 1970, pp. 81, 82.

Primary Examiner—Richard C. Queisser
Assistant Examiner—John P. Beauchamp
Attorney, Agent, or Firm—Frank R. Trifari; David R. Treacy

[57] ABSTRACT

A transducer for measuring the amplitude of vibration of a member vibrating at a constant frequency. An outflow aperture is supplied from a compressed air supply, and opposite to the outflow aperture an obstructing element is arranged which can close the outflow aperture, the outflow aperture and element undergoing relative motion transverse to the direction of air flow. The average quantity of outflowing air is measured.

6 Claims, 8 Drawing Figures

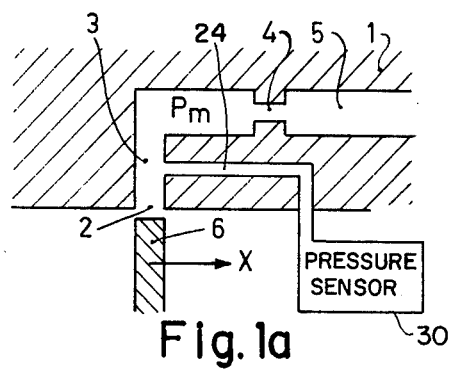
Fig. 1a
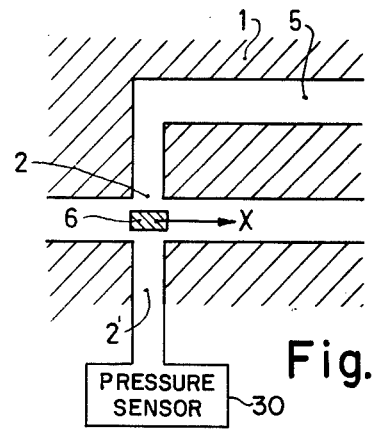
Fig. 1b
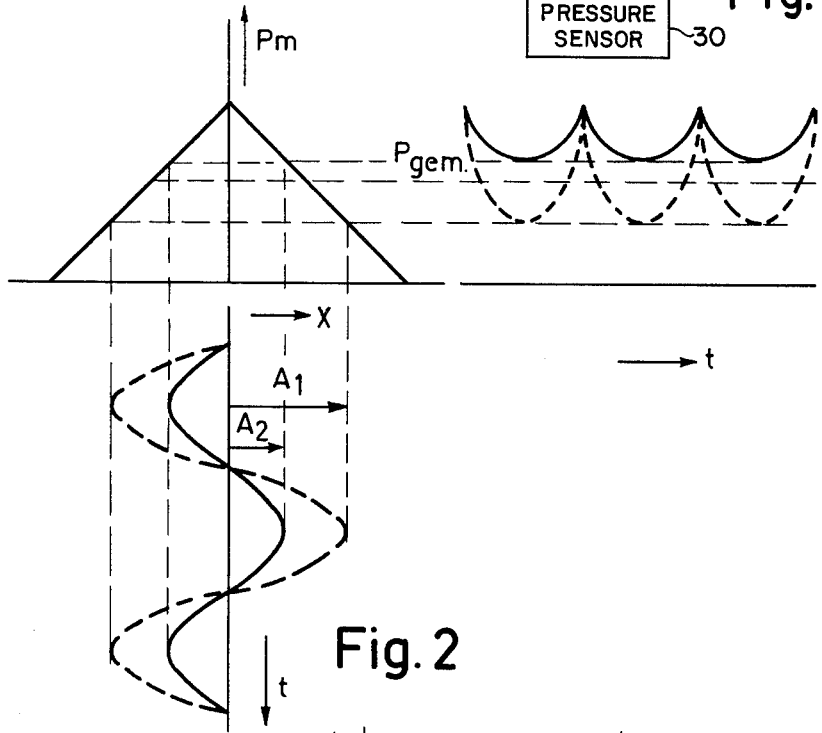
Fig. 2
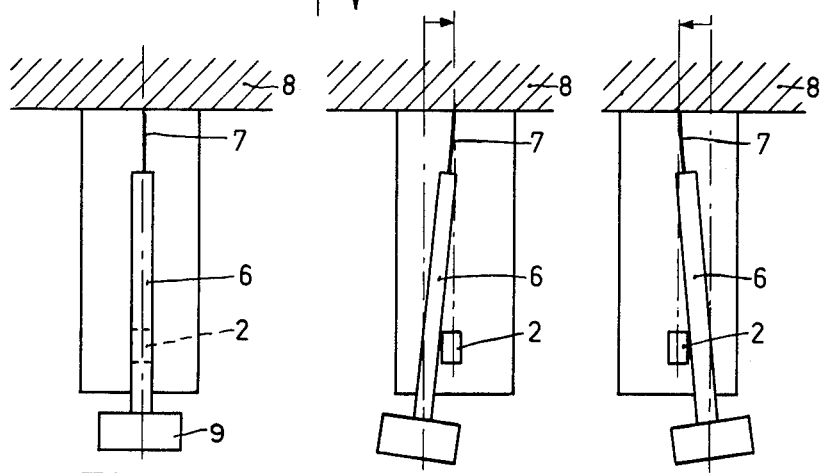
Fig. 3a   Fig. 3b   FFig. 3c

VIBRATION AMPLITUDE TRANSDUCER

The invention relates to a transducer for measuring the amplitude of vabration of a vibrating member.

In many places in automation, vibratory hoppers are used for the directed supply of components. Some of them are excited electrically, others are excited pneumatically.

The vibration amplitude of such devices proves to be considerably dependent on the filling weight and the damping occurring between the products. Of course the frequency is substantially constant. Good amplitude controls are available for the electrically excited vibratory hoppers. For the pneumatically excited vibratory hoppers, however, a good control has so far not been available, mainly because of lack of a good amplitude transducer for said systems.

It is the object of the invention to provide a pneumatic amplitude transducer.

According to the invention, this transducer is characterized in that it is formed by an outflow aperture which is supplied from a compressed air supply through a duct; an obstructing element arranged opposite to the outflow aperture and capable of closing the outflow aperture at least partly, the outflow aperture being connected to the vibrating member and the obstructing element being rigidly mounted, or conversely, the aperture being fixed and the obstructing element vibrated; and a sensing device for measuring a signal which is related to the outflowing quantity of air.

In a preferred embodiment, a restriction is present in the air supply duct, and the sensing device records the average pressure in the part of the duct between the outflow aperture and the restriction.

In this transducer the average pressure in the part of the duct between the outflow aperture and the restriction is determined by the supply pressure, the resistance of the restriction and the outflow resistance. When the obstructing element is in its central or zero position opposite the aperture, the outflow resistance is a maximum and hence also the pressure in the said part of the duct.

In the two extreme positions of the obstructing element with respect to the aperture, the outflow resistance is minimum and hence the pressure is also low. The peak value of the pressure in the central position of the obstructing element is therefore independent of the vibration while the lowest value of the pressure depends on the amplitude of the vibrating member.

As a result the average pressure will decrease when the vibrating amplitude increases, and conversely increase when the vibration amplitude decreases. A signal proportional to the average pressure becomes a measure of the vibrating amplitude. This signal can very easily be used for the control of, for example, a vibratory hopper, and also for other applications.

The same result can be achieved in an embodiment of the transducer in which at some distance opposite to and coaxial with the outflow aperture a further aperture is made to communicate with a pressure recording device via a duct.

In a further preferred embodiment the outflow aperture has a rectangular cross-section; in that case around the central position the air outflow increases proportionally with the lateral displacement of the obstruction element.

In yet another embodiment, according to the invention the width of the obstructing element is made equal to that of the outflow aperture so that there is no dead zone.

In still a further embodiment of a transducer according to the invention the obstructing element is coupled by a spring to the vibrating member, while the outflow aperture is rigidly connected to the member. With a suitable choice of the resilience and the mass of the obstructing element so that the natural resonant frequency of their combination is below the vibration frequency, the element will be stationary relative to the member when said member vibrates. An advantage of this embodiment is that variations of the zero position of the vibrating member have no influence on the signal measured by the transducer.

In this embodiment, as a result of the Coanda effect, forces may be exerted on the obstructing element due to the negative pressure of air flowing past its sides, which tend to cause the element to resonate. In order to prevent this, the obstructing element in a further embodiment comprises means which prevent the outflowing air from producing a negative pressure along its sides.

In order to be able to adjust the sensitivity of the transducer, the obstructing element in a further embodiment has an elongate construction and several outflow apertures are arranged opposite to the element, any one of which may be used at will.

The invention will be described in greater detail with reference to the drawing.

FIG. 1a shows diagrammatically a transducer according to the invention.

FIG. 1b shows diagrammatically a different embodiment transducer according to the invention.

FIG. 2 shows the relationship between measured pressure and amplitude for the embodiment of FIG. 1a.

FIG. 3 is a diagrammatic view of an obstructing element connected to the vibrating member via a spring.

Figure 4:
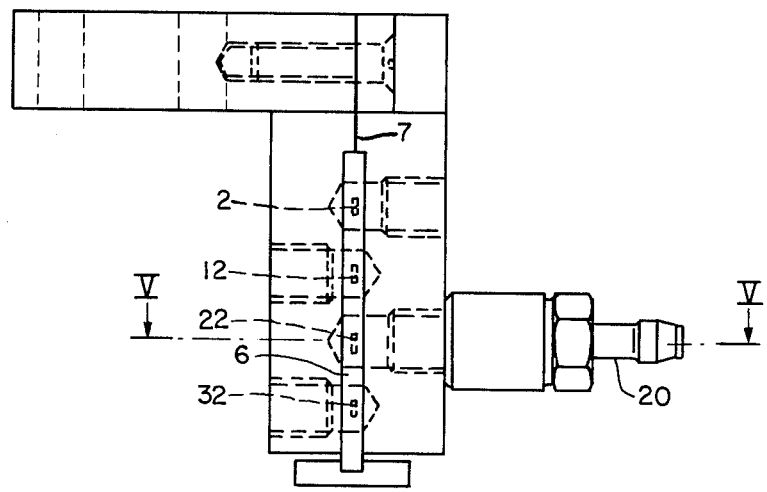
FIG. 4 is a view of a transducer having several outflow apertures.

Reference numeral 1 in FIG. 1a denotes a part having an outflow aperture 2 which communicates, via duct part 3 and restriction 4, with a duct 5 through which compressed air can be supplied. The pressure $P_m$ in the duct part 3 can be measured by connection of a pressure sensor 30, shown schematically, to a cross-bore 24.

An obstructing element 6 is arranged opposite to the outflow aperture 2.

The part 1 may be a part of a vibrating member or a part which can be coupled to such a vibrating member.

The obstructing element 6 is rigidly mounted so that during operation the outflow aperture 2 moves transversely with respect to the direction of air flow through the aperture and with respect to the obstructing element.

FIG. 1b shows an embodiment in which the duct 5 has no restriction but in which opposite to the outflow aperture 2 a further aperture 2' is present which is connected, via a duct, to a pressure recording device 30 shown schematically. By periodically closing the outflow aperture to a greater or lesser degree, the pressure in the aperture 2' will vary in accordance therewith.

FIG. 2 shows how the pressure Pm, which prevails in the duct part 3 varies with the amplitude A of the movement of the outflow aperture 2 relative to the obstructing element 6. Of course the peak value of Pm is the same for any amplitude value. However, the lowest value of Pm is lower at a large amplitude $A_1$ than at a small amplitude $A_2$. This means that with large amplitude, Pgem will also be lower than with a small amplitude. In this manner a significant measure of the amplitude is obtained.

FIG. 3 shows diagrammatically how the obstructing element 6 may be connected to the vibrating member 8 by a leaf spring 7. The lower end of the obstructing element 6 also comprises an extra mass 9. With a suitable choice of the mass and the spring, such that their natural resonant frequency in the direction of the vibration is sufficiently below the frequency of vibration, the obstructing element 6 will remain stationary when the member 8 vibrates so that the outflow aperture 2 moves with respect to the element 6.

In order to be able to adjust the sensitivity of the transducer, more outflow apertures 2 may be provided, as in the transducer shown in FIG. 4, which apertures can each be made to communicate at will with an air supply. In this embodiment the element 6 is elongated in a direction transverse to the direction of air flow though the apertures and the direction of vibration, and the apertures are arranged opposite different portions of the element 6 along its direction of elongation. Because of the angular motion about the leaf spring 7 the aperture 32 has far greater sensitivity to vibration than the apertures 2 or 12. It would therefore be obvious to select the aperture 2 connections to control a large vibration amplitude, and progressively switch connections for smaller amplitudes.

Figure 5:
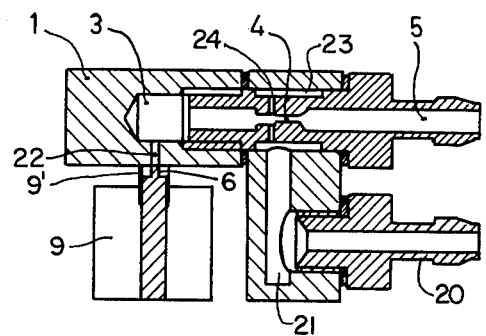
FIG. 5 is a sectional view of the transducer of FIG. 4 along the line V—V, showing how the Coanda effect on the obstructing element can be suppressed.

FIG. 5 shows diagrammatically a transducer in which the side of the obstructing element 6 facing the outflow aperture has a slightly tapering construction and in which shields 9' are provided on the element's sides. This prevents the air flow from the aperture 22 from exerting forces on the sides of element 6 as a result of the Coanda effect which might cause the element 6 to resonate.

Also shown in FIG. 5 are a practical form of connection for sensing the quantity of outflowing air. A fitting 20 communicates with a cross duct 21 which in turn leads to a bore 23 in the part 1, and which bore further has an average pressure the same as in duct part 3 because of communications via a cross-bore 24. A similar set of fittings and ducts communicate independently with each aperture.

In the above-described manner an extremely simple but nevertheless accurately operating amplitude transducer is obtained.

What is claimed is:

1. A transducer for measuring the amplitude of vibration of a vibrating member, comprising a duct having an outflow aperture, means for providing a flow of compressed air to said duct, means for sensing the outflowing quantity of air, an obstructing element, and means for mounting said duct and said element for relative motion transverse to the direction of air flow through said aperture in response to the amplitude of vibration of a vibrating member, said element being arranged opposite said aperture so as to obstruct air flow therethrough at least partially when said element and aperture are in a central position of said relative movement, wherein said obstructing element comprises means for preventing negative pressure due to air flow along a side of the element.

2. A transducer as claimed in claim 1 wherein said preventing means comprises a pair of shields arranged on respective opposite sides of the obstructing element.

3. A transducer as claimed in claim 1 wherein said vibration is at a given frequency, and said mounting means comprises resilient means for coupling said element to said duct, said element and resilient mounting means having a natural resonant frequency less than said given frequency.

4. A tranducer for measuring the amplitude of vibration of a member vibrating at a given frequency, comprising a duct having an outflow aperture, means for providing a flow of compressed air to said duct, an obstructing element, resilient mounting means for coupling said element to said duct for vibratory motion transverse to the direction of airflow through said aperture, and means for sensing the outflowing quantity of air, said element being arranged opposite said aperture so as to obstruct airflow therethrough at least partially when said element is in a zero position, said element and resilient mounting means having a natural resonant frequency less than said given frequency, wherein said element is elongated in a direction transverse to the direction of vibration and to the direction of airflow through the aperture, said transducer comprising a plurality of apertures arranged in the direction of elongation.

5. A transducer for measuring the amplitude of vibration of a member vibrating at a given frequency, comprising a first duct having an outflow aperture, means for providing a flow of compressed air to said first duct, an additional duct having an aperture arranged coaxially opposite said outflow aperture at a given distance therefrom, an obstructing element, resilient mounting means for coupling said element to said first duct for vibratory motion transverse to the direction of airflow through said outflow aperture, said obstructing element being between said apertures so as to obstruct airflow through said outflow aperture at least partially when said element is in a zero position, said element and resilient mounting means having a natural resonant frequency less than said given frequency, and means for communicating between said additional aperture and a pressure sensing device.

6. A transducer as claimed in claim 5 wherein said outflow aperture has a rectangular cross-section, and said obstructing element has a width equal to the width of the outflow aperture.

* * * * *